(12) United States Patent
Moore, Jr. et al.

(10) Patent No.: US 7,784,255 B2
(45) Date of Patent: Aug. 31, 2010

(54) ROTARY CUTTERS

(75) Inventors: Fred P. Moore, Jr., Valley Grande, AL (US); Jack L. Harrington, Montgomery, AL (US)

(73) Assignee: Bush Hog Inc., Selma, AL (US)

(*) Notice: Subject to any disclaimer, the term of this patent is extended or adjusted under 35 U.S.C. 154(b) by 113 days.

(21) Appl. No.: 12/270,119

(22) Filed: Nov. 13, 2008

(65) Prior Publication Data

US 2009/0126330 A1    May 21, 2009

(51) Int. Cl.
*A01D 67/00* (2006.01)
(52) U.S. Cl. .......................... 56/320.1; 56/6
(58) Field of Classification Search .............. 56/6, 56/15.1, 16.7, 16.9, 17.5, 320.1, 320.2, DIG. 20
See application file for complete search history.

(56) References Cited

U.S. PATENT DOCUMENTS

| | | | |
|---|---|---|---|
| 2,759,305 A | 8/1956 | Helbig | |
| 2,763,116 A | 9/1956 | Flinchbaugh et al. | |
| 2,816,410 A | 12/1957 | Nobles | |
| 2,838,901 A | 6/1958 | Davis | |
| 2,989,723 A | 8/1959 | Goodall | |
| 3,007,378 A | 11/1961 | Thieme et al. | |
| 3,053,033 A | 9/1962 | Maguire | |
| 3,107,472 A | 10/1963 | Witt et al. | |
| 3,263,406 A | 8/1966 | Hanson et al. | |
| 3,646,739 A * | 3/1972 | Dahl | 56/320.1 |
| 3,757,500 A | 9/1973 | Averitt | |
| 3,774,464 A * | 11/1973 | McCanse et al. | 474/63 |
| 3,855,763 A | 12/1974 | Seifert et al. | |
| 3,877,206 A | 4/1975 | Cody et al. | |
| 3,901,003 A | 8/1975 | Erdman | |
| 4,194,345 A | 3/1980 | Pioch et al. | |
| 4,312,421 A | 1/1982 | Pioch | |
| 4,315,396 A | 2/1982 | Oka et al. | |
| 4,453,374 A | 6/1984 | Kuhn | |
| 4,497,160 A | 2/1985 | Mullet et al. | |
| 4,724,660 A | 2/1988 | Bowie et al. | |
| 4,813,218 A | 3/1989 | Claesson | |
| 4,887,420 A | 12/1989 | Cerny, Jr. et al. | |
| 4,899,526 A | 2/1990 | Harris | |
| 4,930,298 A | 6/1990 | Zenner | |
| 5,005,344 A | 4/1991 | McCracken | |
| 5,031,389 A | 7/1991 | Yawn | |
| 5,086,614 A | 2/1992 | Pestka | |
| 5,129,217 A | 7/1992 | Loehr | |

(Continued)

OTHER PUBLICATIONS

Brochure from Deere website: John Deere Heavy and Commercial-Duty Rotary Cutters, circa 2006.

(Continued)

*Primary Examiner*—Thomas B Will
*Assistant Examiner*—Joan D Misa
(74) *Attorney, Agent, or Firm*—Cook Alex Ltd.

(57) ABSTRACT

A rotary cutter deck unit that has an overall dual-deck configuration. Upper and lower deck plates do not engage each other at any location, but the deck unit includes front and rear end spacers, at least one of which has a plurality of bends, and two of which are secured to the upper deck plate to form a box-like weldment. The lower deck plate is secured to this spacer at an intermediate location.

16 Claims, 12 Drawing Sheets

U.S. PATENT DOCUMENTS

| | | | |
|---|---|---|---|
| 5,157,908 A | 10/1992 | Sebben et al. | |
| 5,177,942 A | 1/1993 | Hager et al. | |
| 5,184,451 A * | 2/1993 | Savipakka et al. | 56/17.5 |
| 5,203,150 A | 4/1993 | Ryken et al. | |
| 5,212,936 A * | 5/1993 | Lauritsen | 56/6 |
| 5,343,683 A | 9/1994 | Friesen | |
| 5,457,947 A * | 10/1995 | Samejima et al. | 56/16.7 |
| 5,465,564 A | 11/1995 | Koehn et al. | |
| 5,481,857 A | 1/1996 | Umenmoto et al. | |
| 5,483,790 A * | 1/1996 | Kuhn et al. | 56/17.5 |
| 5,566,534 A * | 10/1996 | Fassauer | 56/12.8 |
| 5,609,011 A * | 3/1997 | Kuhn et al. | 56/17.5 |
| 5,638,667 A * | 6/1997 | Ellson et al. | 56/320.1 |
| 5,638,668 A | 6/1997 | Kallevig et al. | |
| 5,657,620 A | 8/1997 | Thagard et al. | |
| 5,765,346 A * | 6/1998 | Benter et al. | 56/2 |
| 5,781,953 A | 7/1998 | Winter | |
| 5,791,132 A * | 8/1998 | Wiedenmann | 56/320.1 |
| 5,816,035 A | 10/1998 | Schick | |
| 5,873,228 A * | 2/1999 | Kirch | 56/15.1 |
| 5,884,466 A | 3/1999 | Willmering et al. | |
| 5,890,354 A | 4/1999 | Bednar | |
| 6,052,980 A | 4/2000 | Friesen | |
| 6,138,446 A | 10/2000 | Velke et al. | |
| 6,189,307 B1 | 2/2001 | Buss et al. | |
| 6,330,783 B2 | 12/2001 | Oxley | |
| 6,546,707 B2 | 4/2003 | Degelman et al. | |
| 6,647,705 B2 | 11/2003 | Ewanochko et al. | |
| 6,681,553 B2 | 1/2004 | Ferree et al. | |
| D501,215 S | 1/2005 | Steele et al. | |
| 6,862,875 B2 * | 3/2005 | Iida et al. | 56/320.2 |
| 6,910,324 B2 * | 6/2005 | Kakuk | 56/255 |
| 7,024,844 B2 | 4/2006 | Schlesser et al. | |
| D547,332 S * | 7/2007 | Degelman et al. | D15/17 |
| 7,249,450 B2 * | 7/2007 | Iida et al. | 56/320.2 |
| 7,305,813 B2 * | 12/2007 | Plouraboue et al. | 56/320.2 |
| 7,707,813 B2 * | 5/2010 | Walter et al. | 56/320.1 |
| 2001/0002534 A1 | 6/2001 | Oxley | |
| 2002/0078672 A1* | 6/2002 | Hubscher | 56/14.7 |
| 2003/0005672 A1* | 1/2003 | Friesen | 56/6 |
| 2003/0145572 A1* | 8/2003 | Kakuk | 56/320.1 |
| 2003/0163981 A1 | 9/2003 | Osbourne | |
| 2005/0198933 A1 | 9/2005 | Klein et al. | |
| 2007/0068133 A1* | 3/2007 | Kure et al. | 56/320.1 |
| 2009/0178382 A1* | 7/2009 | Sugio et al. | 56/320.2 |
| 2009/0205306 A1* | 8/2009 | Foster, III | 56/13.6 |
| 2009/0241502 A1* | 10/2009 | Hofmann | 56/320.1 |

OTHER PUBLICATIONS

Brochure from www.landpride.com: Rotary Cutters-Commander Series, circa 2006.
Brochure from Alamo Industrial: Rotary Mowers "The Eagle Has Landed," Seguin, Texas.
Brochure from Rhino: "First in Flex-Wings!", Gibson City, Illinois.

* cited by examiner

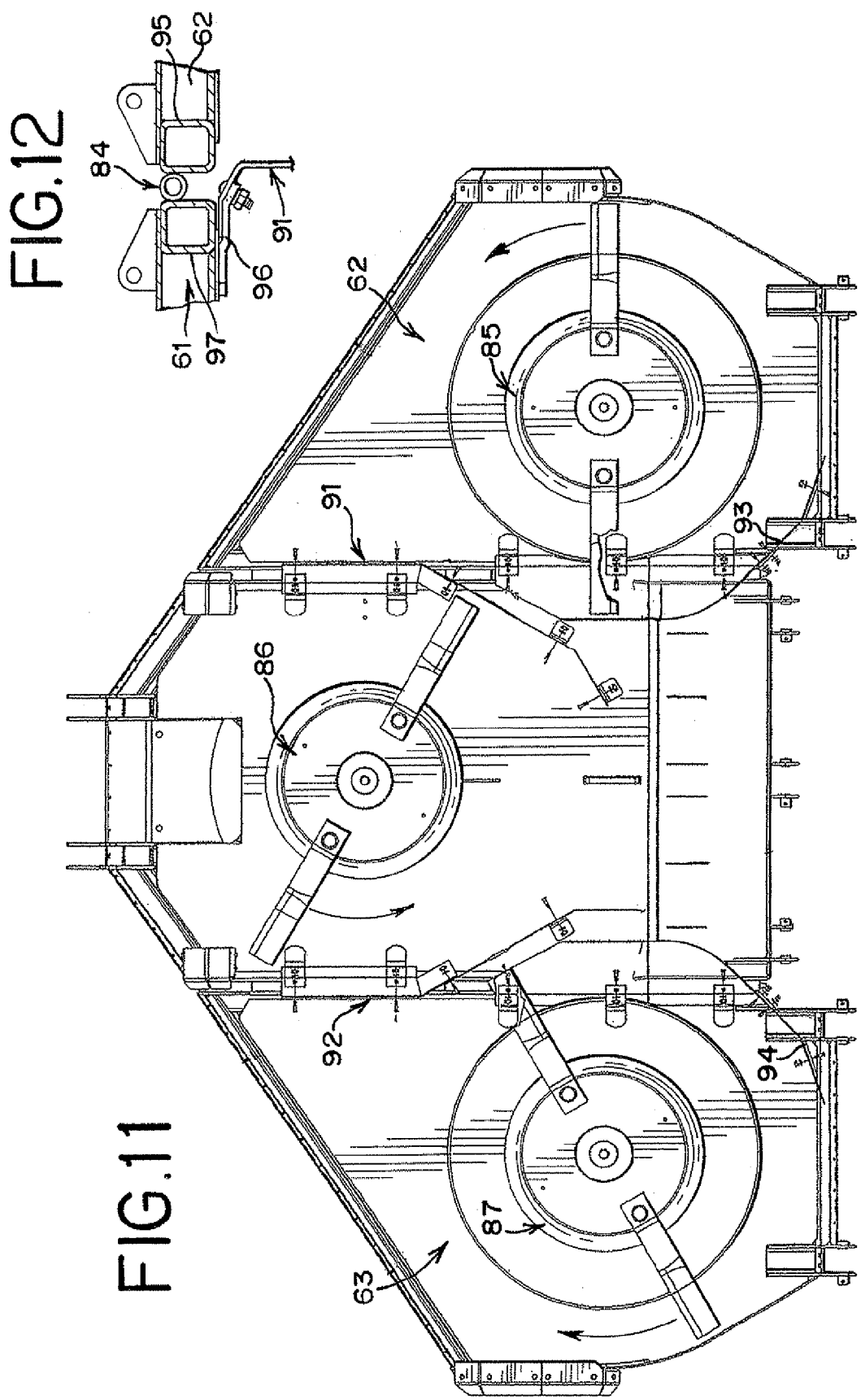

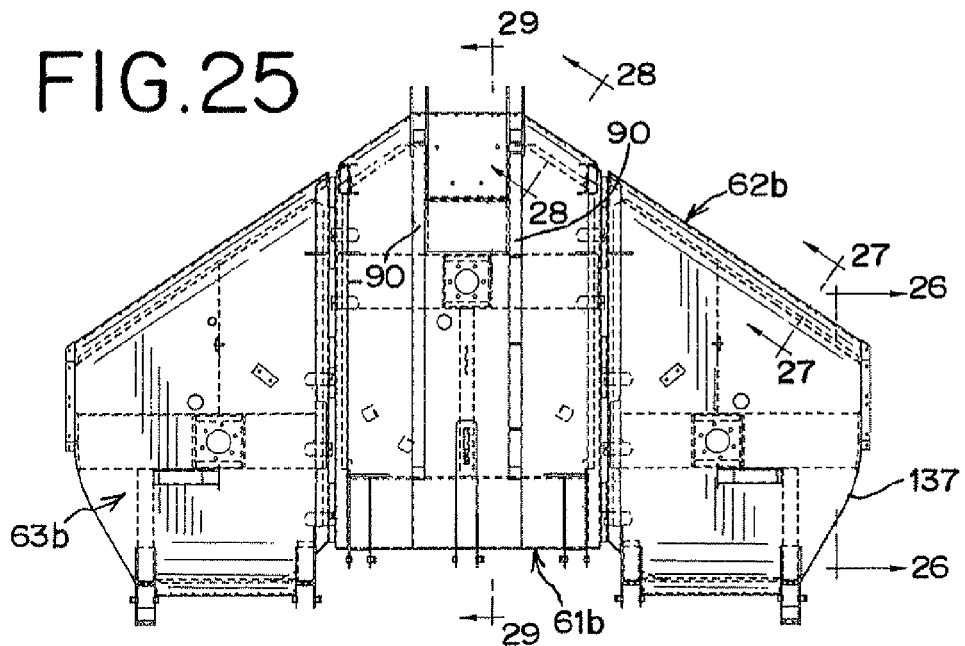
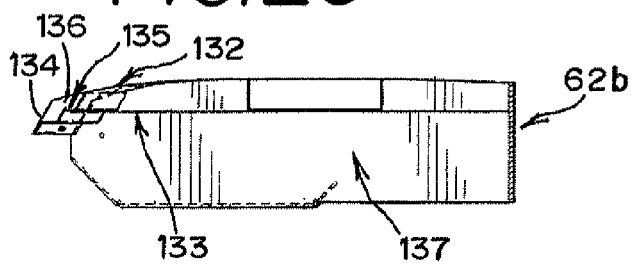
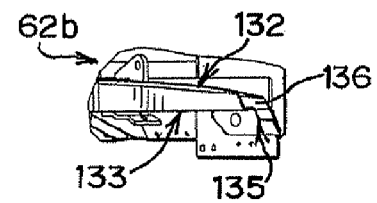
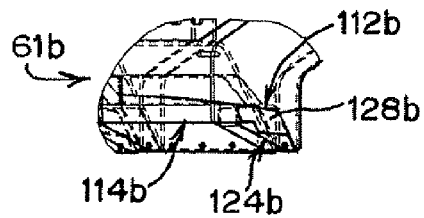
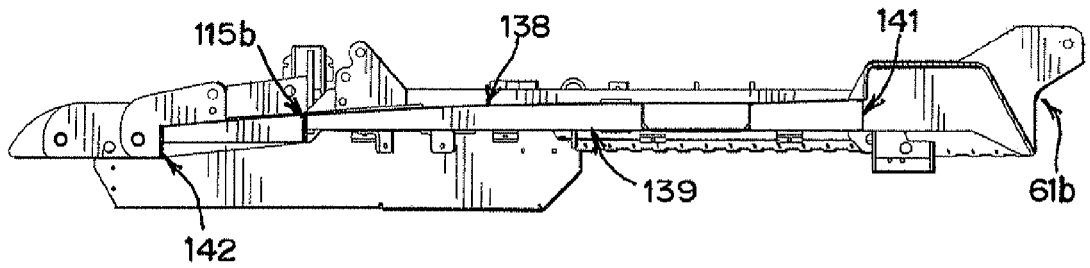

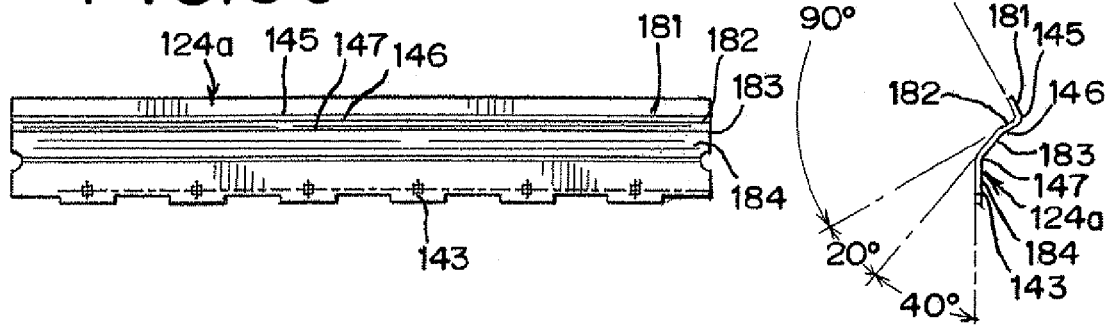
FIG. 30
FIG. 32
FIG. 31
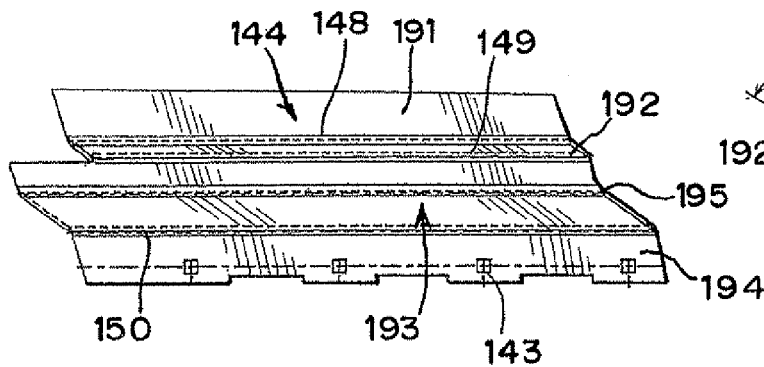
FIG. 33
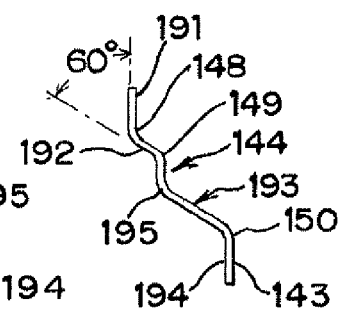
FIG. 34

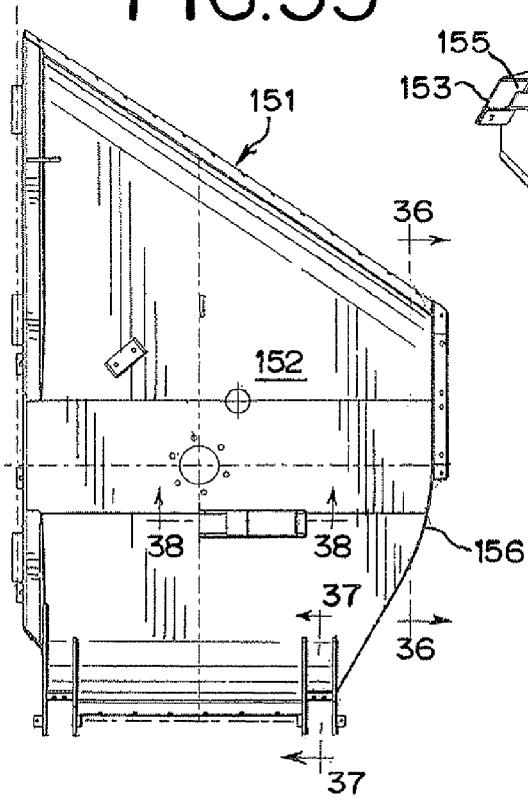
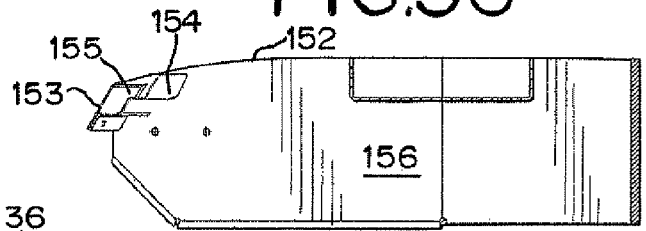
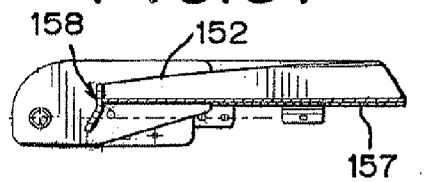
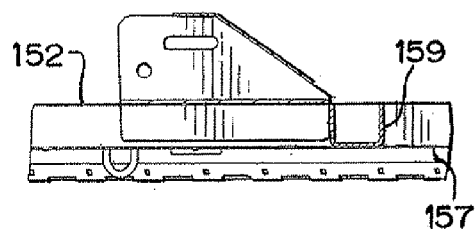
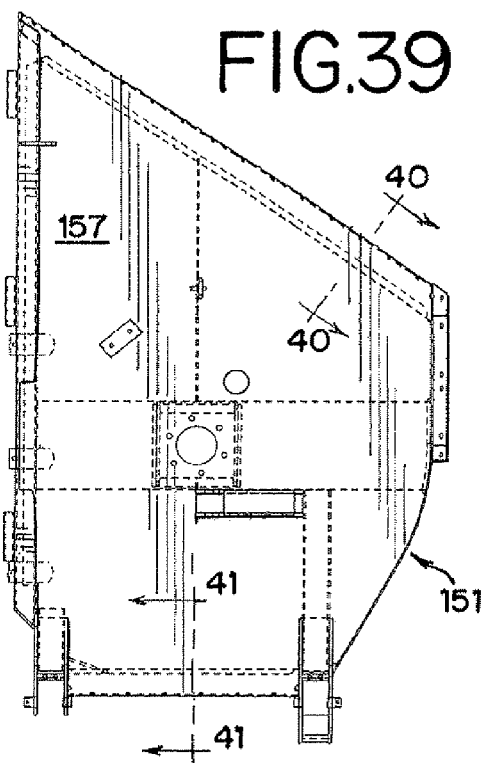
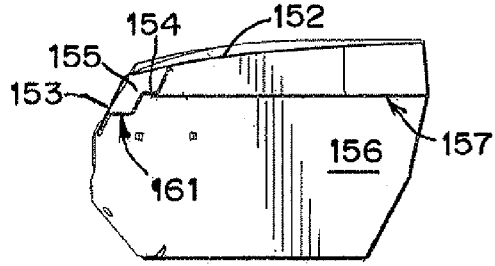
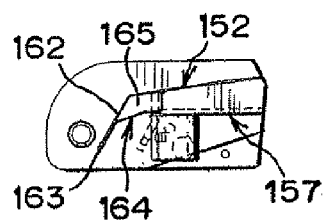

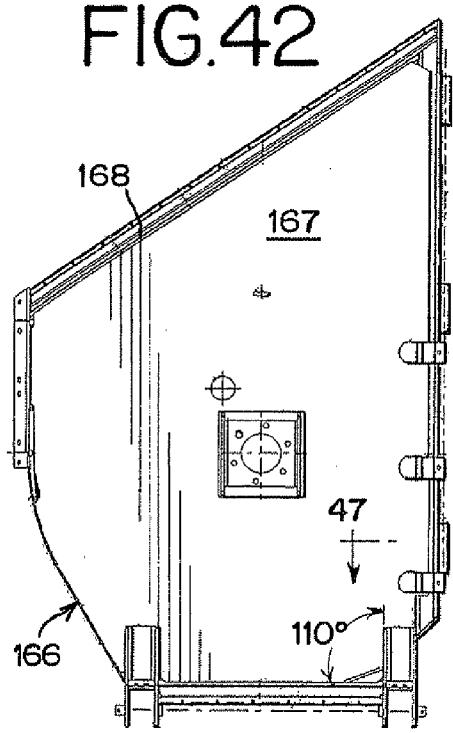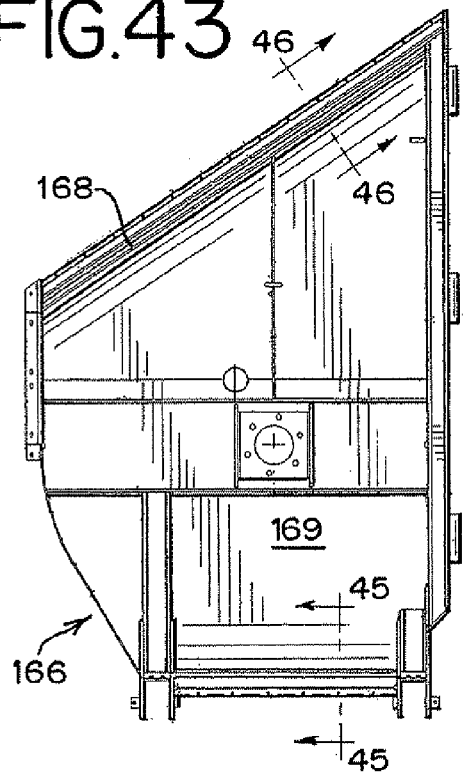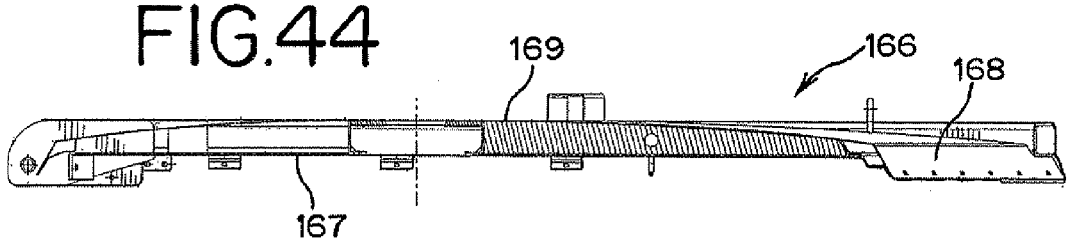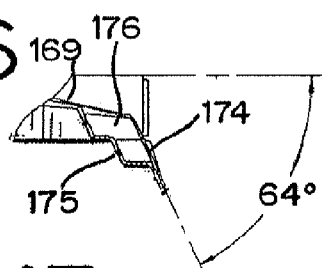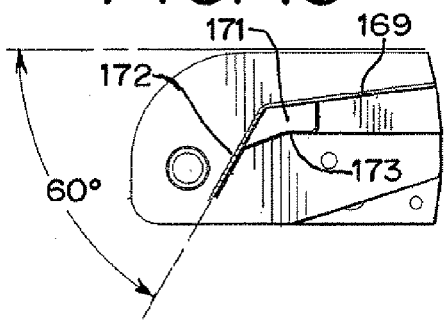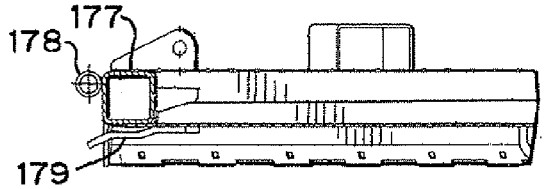

ROTARY CUTTERS

BACKGROUND OF THE INVENTION

1. Field of the Invention

The present invention generally pertains to a rotary cutter having a double-deck structure. The rotary cutter includes spacers that separate each upper deck plate and each associated lower deck plate by a plurality of spacers. The deck plates and spacers form a closed box-like structure, with corresponding upper and lower plates being spaced from each other throughout the deck unit so that they never engage each other.

2. Description of Background Art

There is a need to provide double-walled rotary cutter deck units that provide a structurally sound and durable construction that can withstand stresses and strains encountered when such decks are used on large rotary cutters intended to clear vegetation that is especially heavy and/or comprise stands of relatively thick-stalked vegetation such as saplings or crop stubble, which can be typically mixed with coarse grasses and other naturally occurring vegetation.

Deck structures having upper and lower walls that engage one another are problematic in that they alone do not provide adequate strength or torsional stiffness for rugged rotary cutters. Also, having upper and lower decks that engage each other can require substantial bending of the deck plate or plates when they form a double-deck structure by having one or both plates exhibit bending or curving in order to be brought into engagement with each other.

Prior art approaches include those of Bowie et al. U.S. Pat. No. 4,724,660, Cerny, Jr. et al. U.S. Pat. No. 4,887,420 and Friesen U.S. Pat. No. 6,052,980. These and all other references referred to herein are hereby incorporated by reference hereinto as if reproduced herein. Each of these listed references shows an enclosure defined by deck plates.

SUMMARY OF THE INVENTION

An aspect or embodiment of the invention generally pertains to double-deck structures for rotary cutters, particularly those intended for rugged industrial, agricultural and/or right-of-way maintenance where it is important to maintain a rigid structure so that all upper and lower deck plates remain at their proper location with respect to each other and provide good rigidity and torsional strength. Essentially, deck plate components can be assembled into a box-like deck structure.

According to another aspect or embodiment, the present invention includes top wall plates that have peripheral portions that curve generally downwardly and beyond outermost edges of lower deck plates therebelow, such being associated with interior deck wall spacers that have multiple bends generally parallel to the ground and provide a beam-like welded end box to enhance strength, rigidity and torsional stability.

In accordance with another aspect or embodiment, the invention includes the plurality of "strong-back" beams as elongated assembly components secured to the double-deck structure, the deck plates being tied directly to the strong-backs.

According to still another aspect or embodiment, the double-deck structure of the disclosure can be for a multi-deck rotary cutter and can include tie bars connecting hinge rails and hydraulic cylinder base mounting lugs into one structure.

According to further aspects or embodiments, hydraulic cylinder lugs are provided on deck structures of a flex-wing rotary cutter, with the lugs being on the wings and tied into a gearbox stand that extends from a side band to the hinge rail to form one single strong structure.

Other aspects, objects and advantages of the present invention will be understood from the following description according to the preferred embodiments of the present invention, specifically including stated and unstated combinations of the various features which are described herein, relative information concerning which is shown in the accompanying drawings.

BRIEF DESCRIPTION OF THE DRAWINGS

In describing the preferred embodiments of the present invention, reference will be made to the accompanying drawings, wherein:

FIG. 11 is a bottom plan view of a typical three-deck flex-wing rotary cutter arrangement according to an embodiment of the present disclosure;

FIG. 12 is a detail, sectional view at the interface of a side wing deck with a center deck;

FIG. 25 is a top elevational view of a portion of a tri-deck arrangement, with other components of a rotary cutter being omitted for clarity;

FIG. 26 is a cross-sectional view along the line 26-26 of FIG. 25;

FIG. 27 is a cross-sectional view along the lines 27-27 of FIG. 25;

FIG. 28 is a cross-sectional view along the line 28-28 of FIG. 25;

FIG. 29 is a longitudinal cross-sectional view along the line 29-29 of FIG. 25;

FIG. 30 is an elevational view of a deck wall plate spacer for positioning between upper and lower decks in a double-deck structure;

FIG. 31 is a top plan view of the spacer of FIG. 30;

FIG. 32 is an end elevational view of the spacer of FIG. 31;

FIG. 33 is a perspective view of another deck wall plate spacer for positioning between upper and lower deck plates of an embodiment according to the present disclosure;

FIG. 34 is an end elevational view of the spacer shown in FIG. 33;

FIG. 35 is a top plan view of a wing deck unit including a dual-deck structure according to the present invention;

FIG. 36 is a cross-sectional view along the line 36-36 of FIG. 35;

FIG. 37 is a cross-sectional view along the line 37-37 of FIG. 35;

FIG. 38 is a cross-sectional view along the line 38-38 of FIG. 35;

FIG. 39 is an elevational view of another wing deck;

FIG. 40 is a cross-sectional view along the line 40-40 of FIG. 39;

FIG. 41 is a cross-sectional view along the line 41-41 of FIG. 39;

FIG. 42 is a bottom plan view of the deck generally shown in FIG. 35;

FIG. 43 is a bottom plan view corresponding to FIG. 42, but with the bottom deck removed;

FIG. 44 is an elongated cross-sectional view through a wing deck structure shown generally along the longitudinal center of the wing deck;

FIG. 45 is a cross-sectional view similar to FIG. 41, taken along the line 45-45 of FIG. 43, with the bottom deck plate removed for clarity;

FIG. 46 is a cross-sectional view of an area corresponding to FIG. 40, taken along the line 46-46 of FIG. 43, with the bottom deck plate removed for clarity; and FIG. 47 is an elevational view, partially in cross-section at line 47-47 of FIG. 42 of a wing deck, showing an edge area thereof for attachment to another deck.

DESCRIPTION OF THE ILLUSTRATED EMBODIMENTS

As required, detailed embodiments of the present invention are disclosed herein; however, it is to be understood that the disclosed embodiments are merely exemplary of the invention, which may be modified in various forms. Therefore, specific details disclosed herein are not to be interpreted as limiting, but merely as a basis for the claims and as a representative basis for teaching one skilled in the art to variously employ the present invention in virtually any appropriate manner.

The deck units disclosed herein provide torsional stiffness and provide adequate strength, especially along the peripheries of the deck. The present decks maintain a total separation of all top deck plates from all bottom deck plates. The box structures or weldments formed at the front and rear ends of each deck unit provide a particularly advantageous increase in strength that is not achieved when upper and lower deck plates are welded or otherwise secured to each other. The present deck units or weldments have spacers added between the upper and lower deck plates along the front and rear edges in order to provide a box or tubular end portion weldment or beam. Such weldments or beams provide strength to withstand up and down flexing and torsion twisting while also providing support for additional weight of front and rear enclosure members or curtains, such as safety chains, this being done without the addition of extra components. Also, by forming these front and rear beams or weldments from a shaped wall spacer and overlapping portion of the front deck plate itself, cost savings are realized by avoiding a possible need to add end beams to provide needed strength and torsional resistance.

Figure 1:
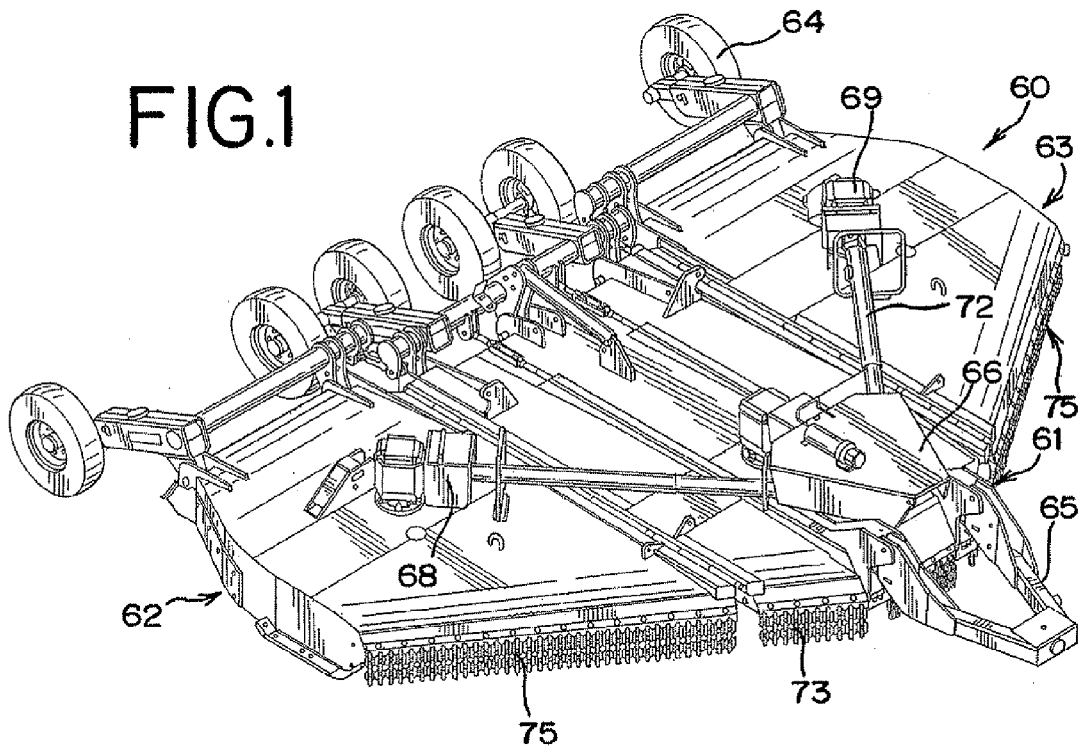
FIG. 1 is a top perspective view of an embodiment of a rotary cutter according to the invention, such being in the form of a multi-wing rotary cutter that provides an especially wide cutting swath.
Figure 2:
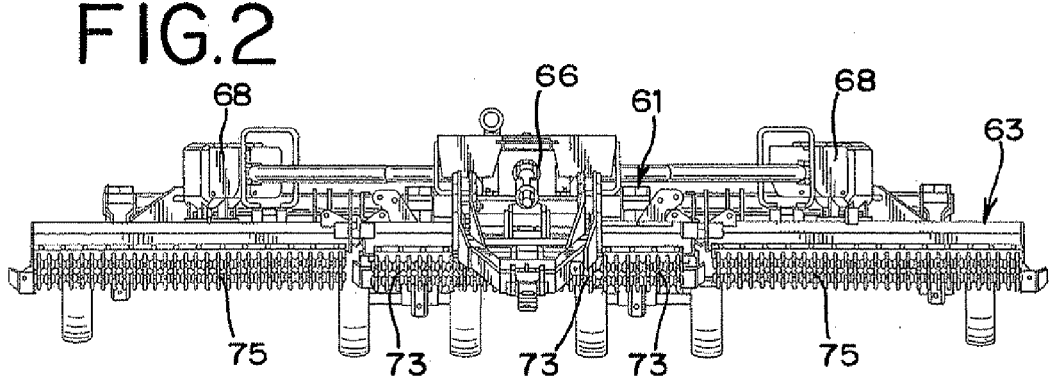
FIG. 2 is a front elevational view of the rotary cutter shown in FIG. 1.
Figure 3:
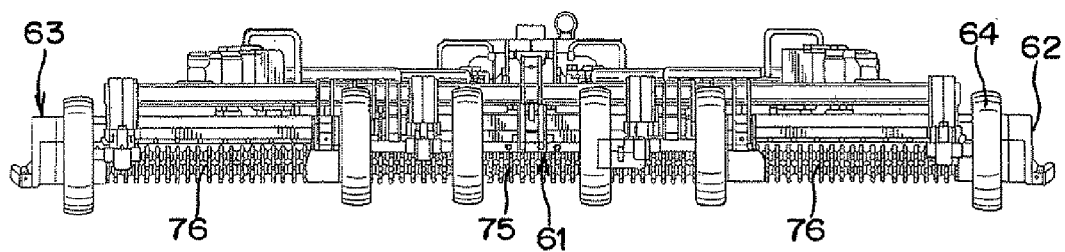
FIG. 3 is a rear elevational view of the rotary cutter shown in FIG. 1.

FIGS. 1, 2 and 3 depict a multi-deck rotary cutter, generally designated as 60, which includes a main or center deck unit 61, a left wing deck unit, generally designated as 62, and a right wing deck unit, generally designated as 63. Wheels 64 are mounted from the rear of each of the deck units, and a hitch assembly 65 is provided at the front of the center deck unit 61. Power into the unit is transmitted to a transfer case 66 in a generally known manner. The power is transmitted from the transfer case 66 to a center gearbox assembly 67, a left gearbox assembly 68 and a right gearbox assembly 69. Typically, drive shafts 71, 72 are employed in this regard. Each drive shaft is in operative communication with a blade positioned on the underside of each deck.

Figure 4:
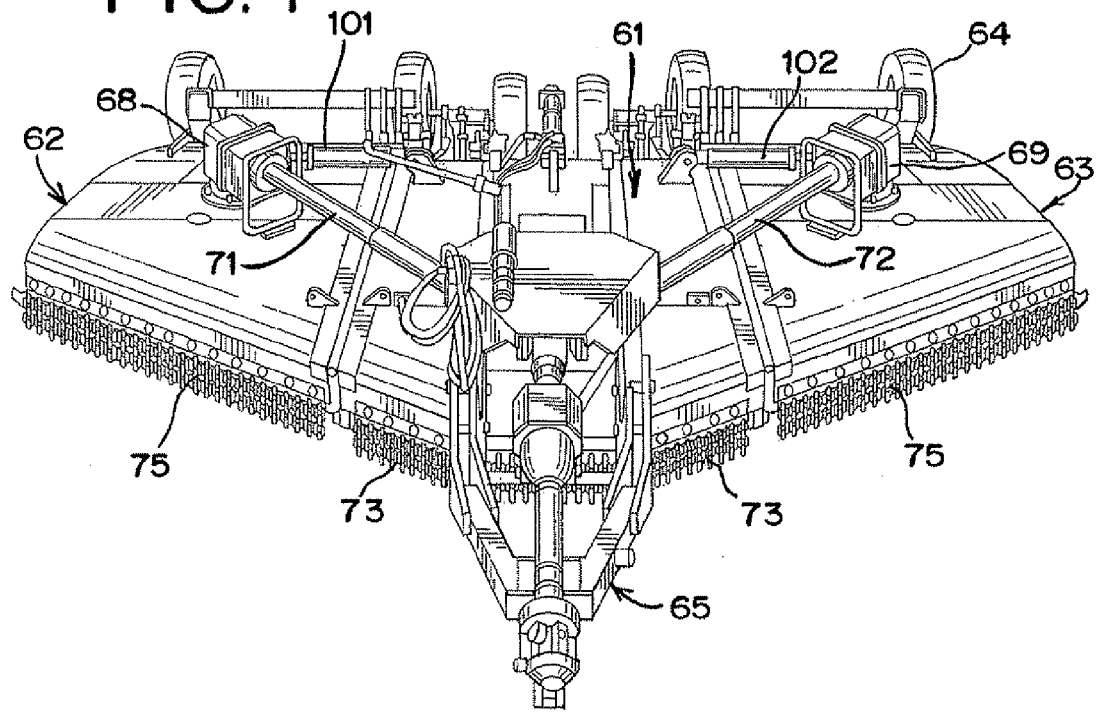
FIG. 4 is a front perspective view of an embodiment of a foldable multi-wing rotary cutter incorporating decks according to the present disclosure.
Figure 5:
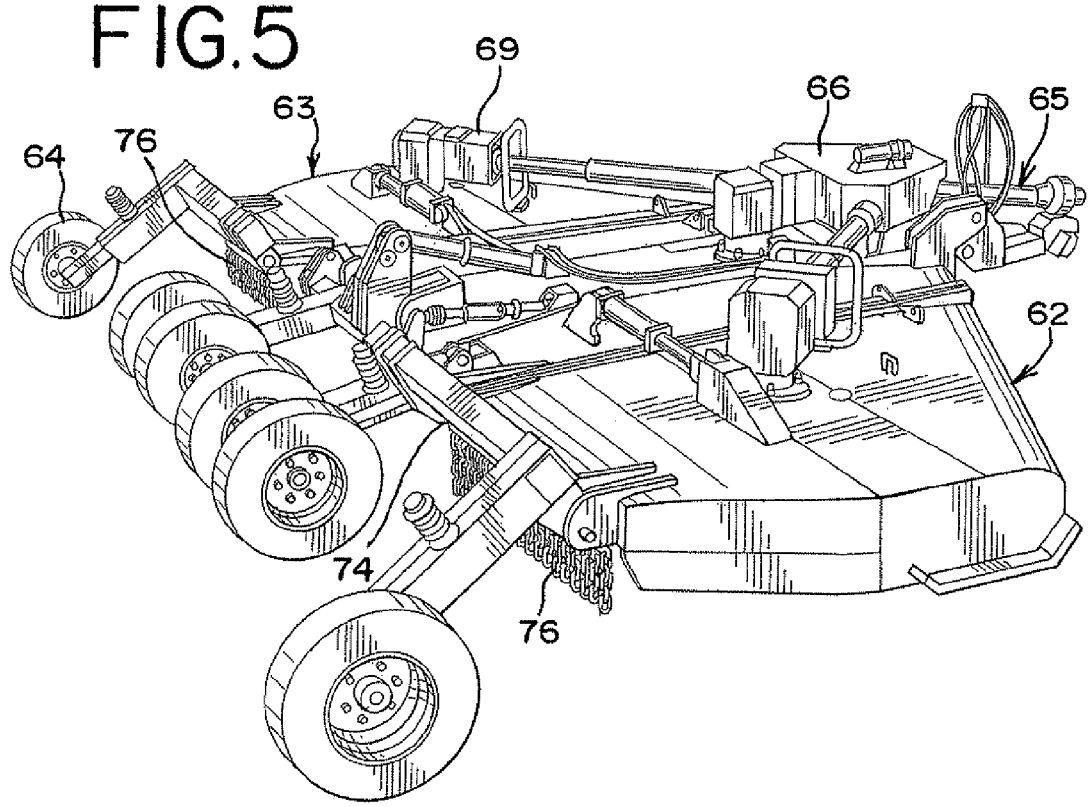
FIG. 5 is another perspective view of the embodiment shown in FIG. 4, taken from one side and toward the rear.

Safety curtains or enclosure members are illustrated in various figures including FIG. 4 and FIG. 5. These are illustrated as safety chain lengths 73 are positioned along the front of the center deck unit 61. Safety curtains such as chain lengths 74 also are provided at the rear of the center deck unit 61. Safety curtains or chain lengths 75 are provided at the front of each wing deck unit, and safety curtains or chain lengths 76 are provided on each of the wing deck units 62, 63.

Figure 6:
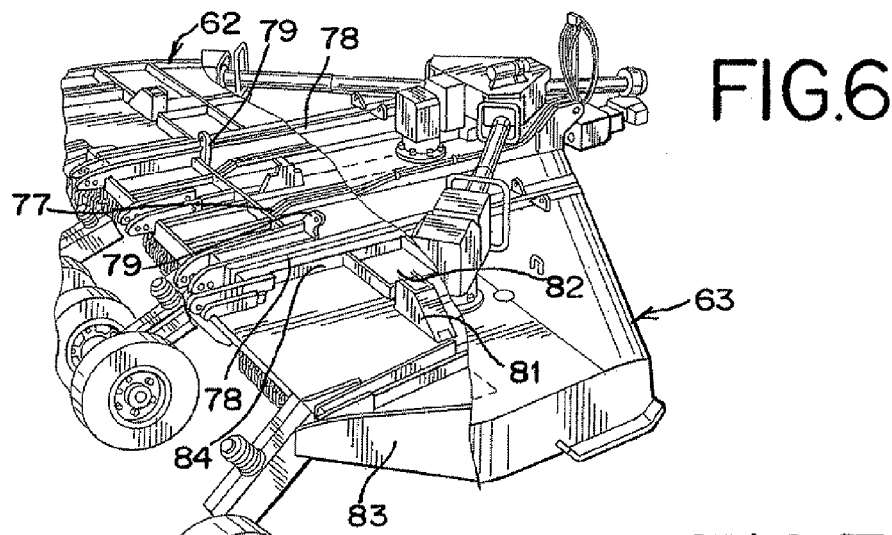
FIG. 6 is a cut-away perspective view of a flex-wing multiple-deck rotary cutter along the lines of that shown in FIG. 4.
Figure 7:
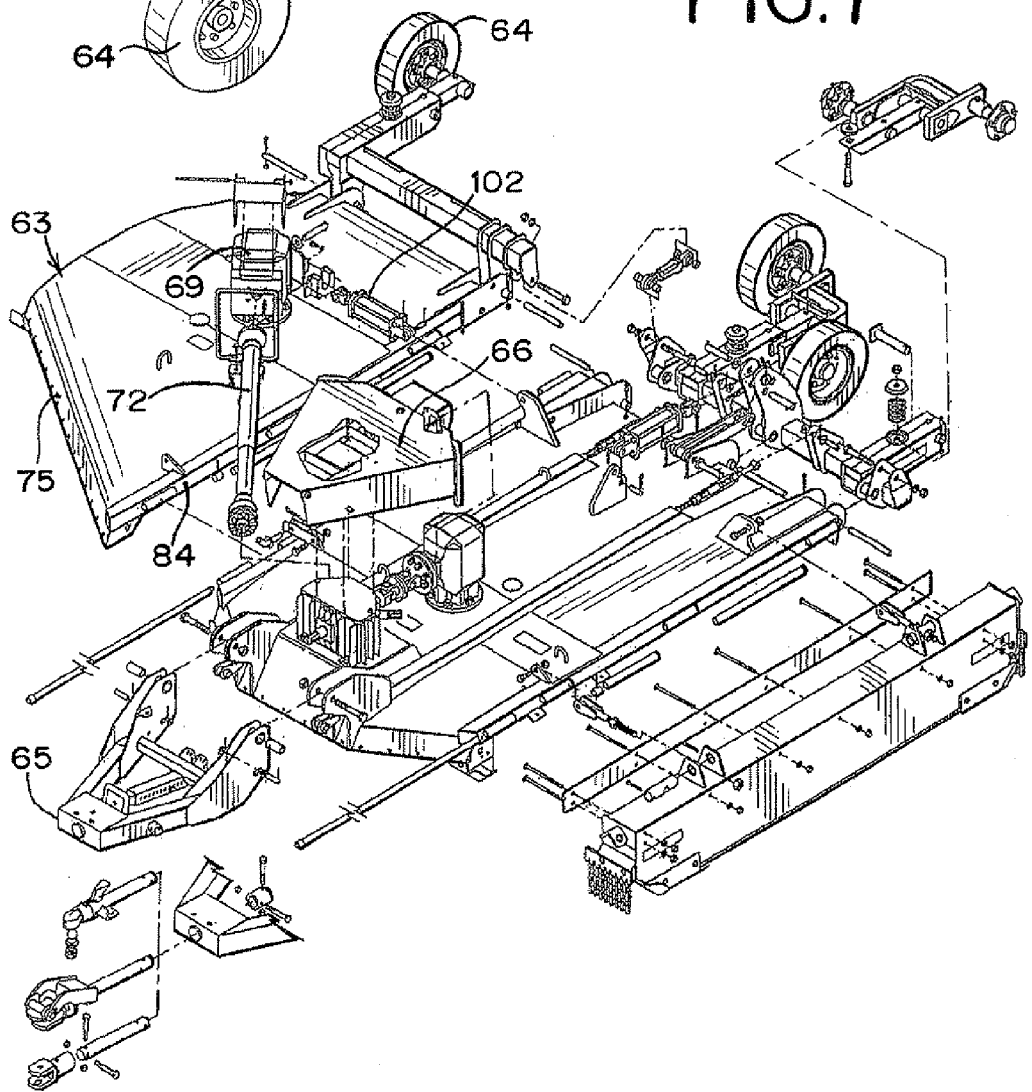
FIG. 7 is an exploded perspective view, with multiple components removed for clarity, of a portion of a multi-deck rotary cutter.
Figure 10:
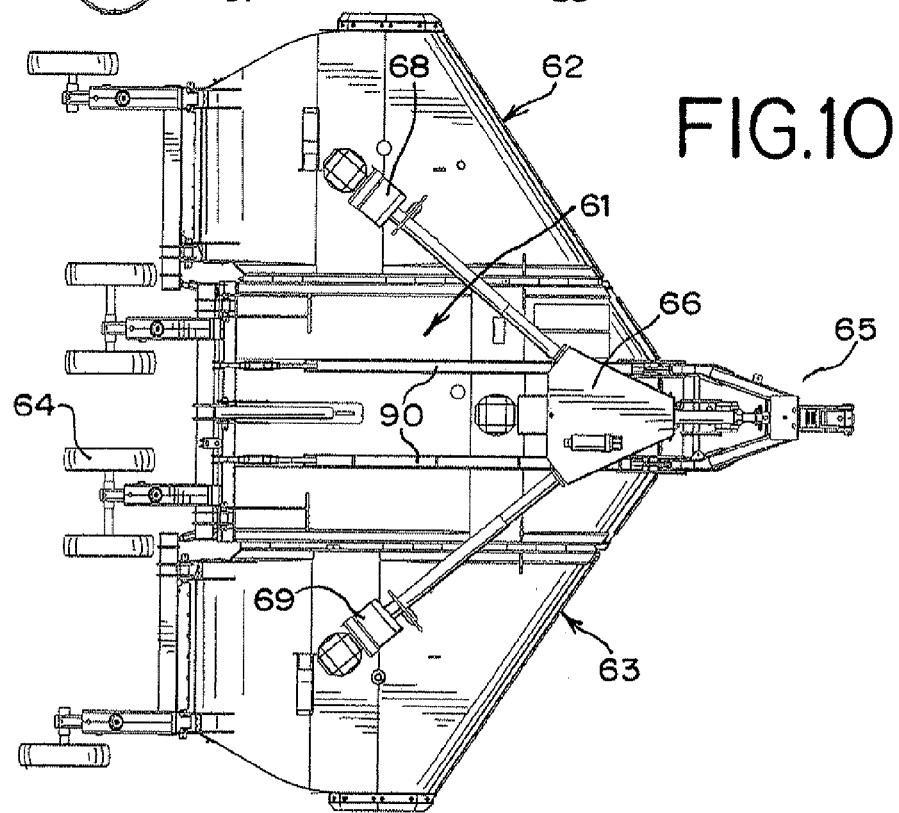
FIG. 10 is a top plan view of the rotary cutter of FIG. 8, with the wings being shown in an operational or "down" orientation.

Details of typical between-deck structures, which are illustrated in FIG. 6, are provided to absorb shock in order to increase deck life. These include ⅜-inch tie bars 77 which connect hinge rails 78 and hydraulic cylinder base mounting lugs 79. The tie bars 77 connect the hinge rails and cylinder mounting lugs into one structure. In addition, wing hydraulic cylinder lugs 81 are tied into a gearbox stand 82, and this extends from the side band 83 to the hinge rail 84 in order to form one single strong structure. Some further details concerning this assembly with a main deck unit and a wing deck unit can be seen in FIG. 7 and in FIG. 8 and FIG. 10.

Figure 9:
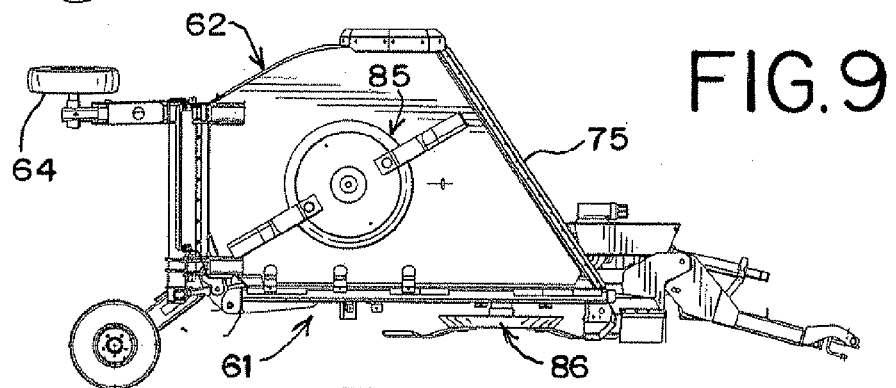
FIG. 9 is a side elevational view of the rotary cutter at the stage shown in FIG. 8.

Blade assembly 85 for the left wing deck unit 62 and the blade assembly 86 for the center wing unit 61 are depicted in FIG. 9 and in FIG. 11. Also, FIG. 11 shows a blade assembly 87 for the right wing unit 63. Strongbacks 90 can be seen in FIG. 10 for example. A strongback is a structure that provides longitudinal support from the front of the cutter to the rear of the cutter. While a strongback does not have to run strictly the full distance of the cutter, it is generally the backbone of the cutter.

FIG. 11 also shows baffles for each of the decks. These include a left center baffle assembly 91 and a right center baffle assembly 92 that assist in directing flow of cut debris, foliage, stover and the like. A left wing baffle assembly 93 and a right wing baffle assembly 94 also are shown for their respective wing deck units. The baffle assemblies are mounted in such a manner that they remain solely with their respective deck units while still providing close spacing between the units so as to minimize undesirable draft development while facilitating an even flow. For example, as shown in FIG. 12, the center baffle assembly 91 extends to and typically overlaps the adjacent wing 62 and particularly its beam 95 to which the plate decks are secured. An extension bracket 96 is provided for mounting the baffle assembly 91 onto the center deck unit 61 through a carriage bolt as shown in FIG. 12. The hinge rod or tube 84 is positioned between the beam 95 of the wing and the outside beam 97 of the center deck unit.

Figure 13:
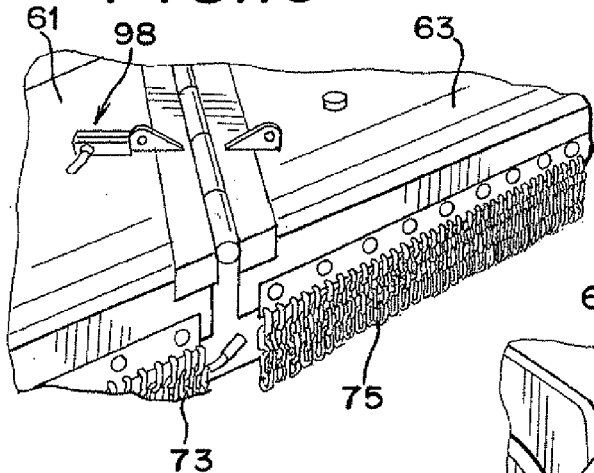
FIG. 13 is a detail, front perspective view of a portion of a multi-deck cutter, showing the interface area between decks and with a wing transport lock pin stored for work.
Figure 13A:
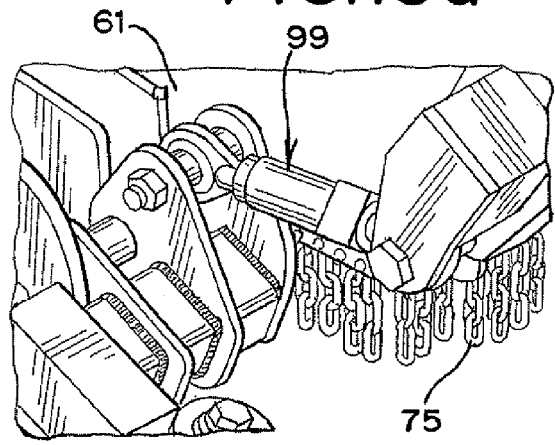
FIG. 13A is a perspective, detail view of an edge of a deck showing an adjustable link.

It is possible when desired to provide components in order to adjust the wing deck unit. FIG. 13 and FIG. 13A illustrate wing adjustment to have the wings be level or parallel left-to-right with the center deck section. Adjustment is achieved by lowering the cutter unit until skids on the center deck unit 61 are one to two inches from the ground. Then wing transport lock pins 98 are removed and placed in link and flip pin onto the deck of the center deck unit for storage. Then, the wings are lowered to the ground allowing the weight to rest on the wheels. If the wing deck units are not level or parallel to the center deck unit, a jam nut can be backed off and the turnbuckle or adjustable link 99 (FIG. 13A) can be adjusted. If shortened, the outside edge of the wing moves lower. If lengthened, the outside edge of the wing is raised. This positions the wing for cutting.

Figure 8:
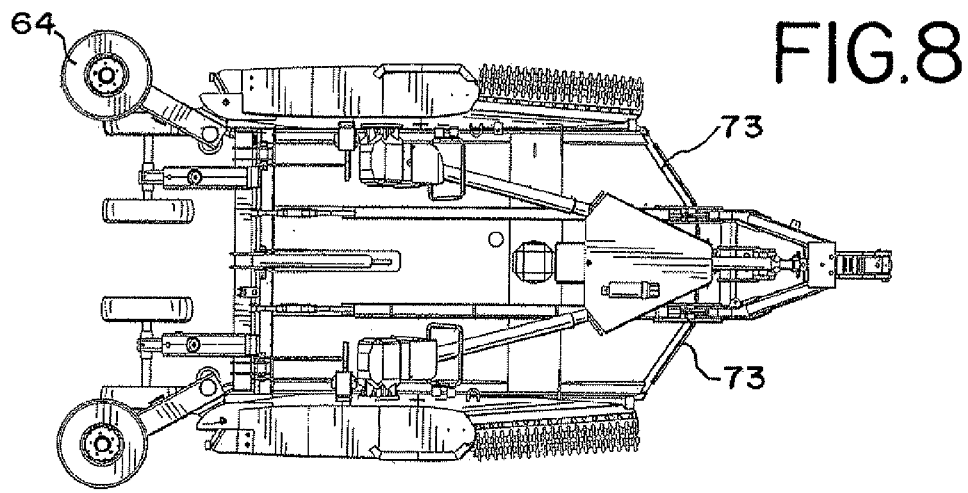
FIG. 8 is a top plan view of a flex-wing rotary cutter incorporating the double-deck structure described herein, shown with the wing decks in a stowed or raised position suitable for transport with a narrow width, such as for highway travel and/or for passage through open gates or fenced areas.

Adjustment can be made for the wing transport action by first folding the wings into the transport position, such as shown in FIG. 8 and FIG. 9. The pin 98 is removed from the transport latch, and the latch is pinned to the wing transport lug. If the pin will not install with the wing fully folded, the rod and clevis on the wing fold cylinder can be adjusted by loosening the clamp bolt on the clevis and rotating the clevis thereby shortening the cylinder to make the wing draw up further, or rotating the clevis to lengthen the cylinder will relax the wing so the pin can be installed and removed without force.

Figure 14:
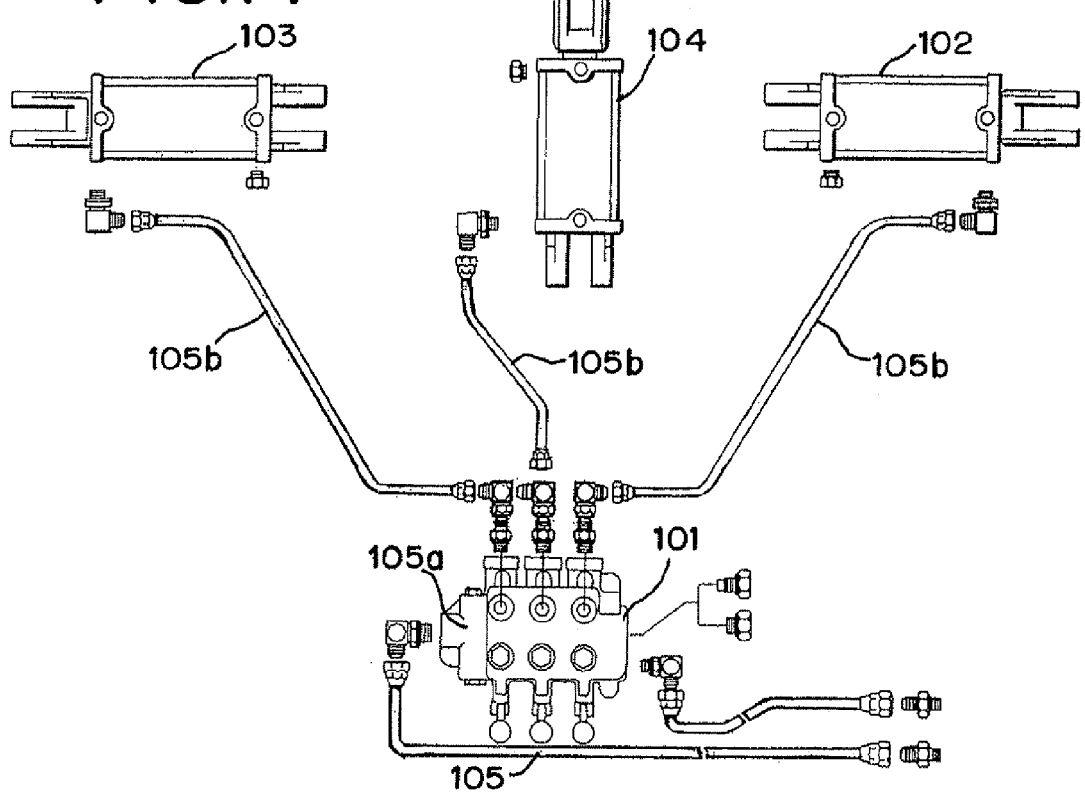
FIG. 14 is a schematic illustration of a hydraulic system suitable for use on a triple-deck rotary mower as generally described.
Figure 15:
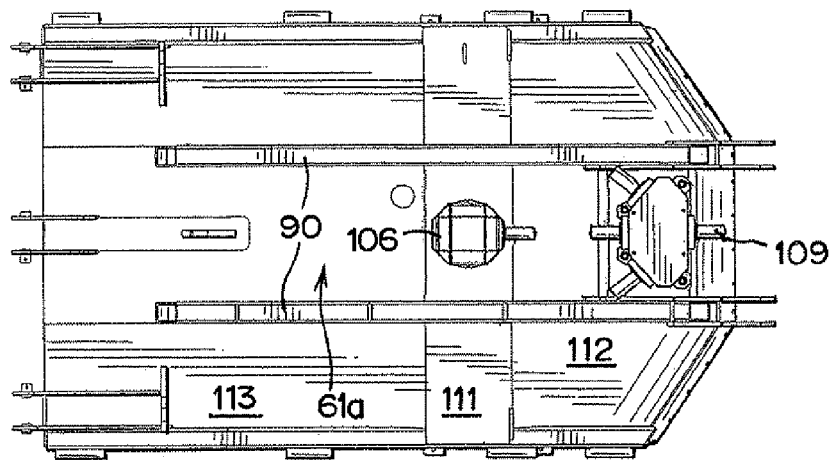
FIG. 15 is a top elevational view of a double-walled deck suitable for use as a center deck of a multi-deck rotary cutter.

FIG. 14 shows a typical hydraulic system for a multi-wing rotary cutter according to the present disclosure. A main valve 101 transfers hydraulic pressure (in a way generally known) among the left wing lift cylinder 102, the right wing lift cylinder 103 and a center height control cylinder 104. An inlet hose 105 feeds into valve 105a to provide selective feeds to the cylinders through the hoses 105b.

FIGS. 15, 16, 17, 18 and 19 show an embodiment of a center deck unit 61a. This includes a gearbox assembly 106 and a transfer gearbox 107. A blade pan assembly 108 also is shown. A gearbox sleeve 109 is shown on the center deck unit.

Figure 16:
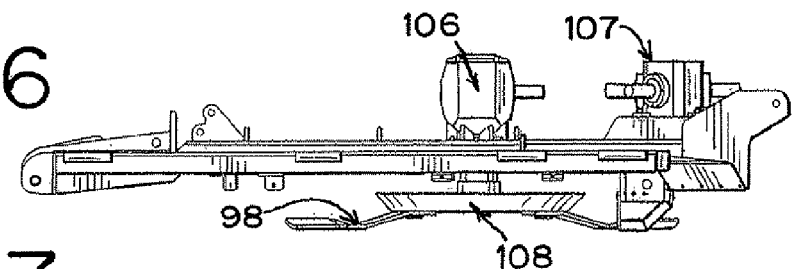
FIG. 16 is a side elevational view of the deck structure illustrated in FIG. 15.
Figure 17:
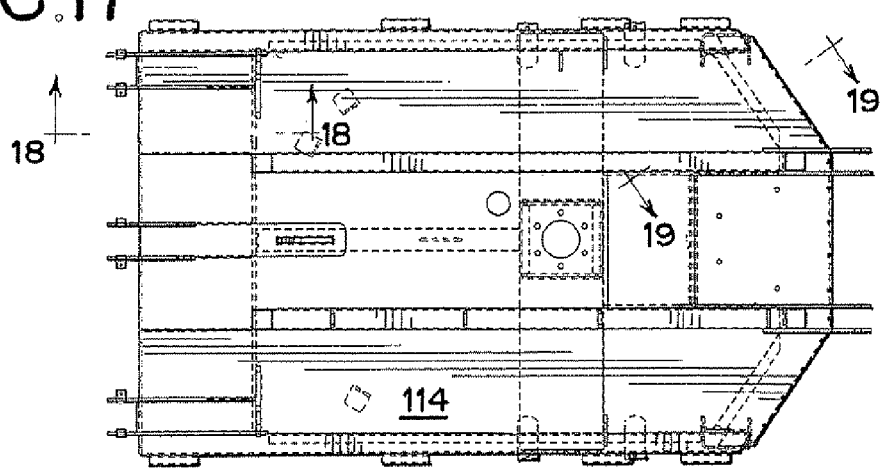
FIG. 17 is a top plan view of the deck structure of FIG. 15, without gearboxes.
Figure 18:
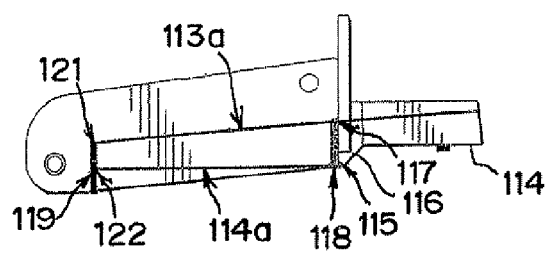
FIG. 18 is a detail, sectional view along the line 18-18 of FIG. 17.

A plurality of top deck plates in this embodiment are illustrated, including a center top deck plate 11, a front top deck plate 112, and a rear top deck plate 113. The center top deck plate has the gearbox assembly 106 mounted onto it. FIG. 16 and FIG. 18 show a bottom deck plate 114 that includes a step-down feature at an internal deck spacer 115, same being positioned adjacent a step 116 of the bottom deck plate 114. A weld 117 secures the top of the internal deck spacer 115 to the top deck, while slot welds 118 secure the lower portion of the internal deck spacer to the bottom deck.

As seen in FIG. 18, a rear end spacer 119 is located at the end of each of a top rear plate 113a and a bottom rear plate 114a. Securement is achieved by weld 121 and weld 122, respectively. Such a rear end spacer 119 is shown extending beyond the bottom plate 114a as shown and can be considered a continuation of the top plate 113a that extends rearwardly and downwardly.

Figure 19:
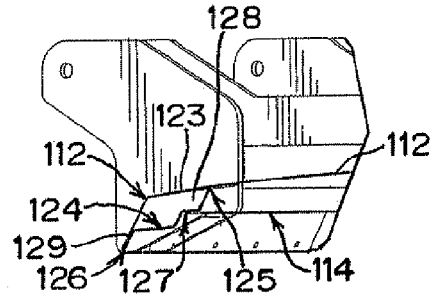
FIG. 19 is a cross-sectional view taken along the line of FIG. 17, showing a portion of the front of the rotary cutter deck unit.

Concerning the front assembly of the center deck unit, reference is particularly made to FIG. 19. Front top deck plate 112 extends beyond and forwardly of the front edge of the bottom deck 114. As illustrated in FIG. 19, this top deck plate 112 includes a front end portion or length 123 that substantially overshoots the bottom plate 114 and continues therebeyond such that this upper deck plate is substantially below the bottom deck plate. An inside front end spacer 124 is joined to the top deck plate 112 at weld 125 and to the front end surface 123 of the top deck plate 112 at weld 126. Weld 127 typically is provided to join the bottom deck plate 114 to the inside spacer 124.

It will be appreciated that, with this combination of the overshooting front end surface 123 and the inside spacer 124, a front end box-like beam or weldment 128 is formed in order to provide enhanced rigidity to the front end of the center deck unit and to provide torsional stability to the deck unit. Also formed is an overhang 129 from which a safety chain 73 or the like can be mounted.

With more particular reference to the box-like beam or weldment formed by the inside spacer 124 and its association with the top deck plate 112 and bottom deck plate 114, the inside spacer 124 has a plurality of bends or creases that are substantially parallel to each other and typically parallel to the ground when the cutter is in use. These bends or creases create multiple panels of the inside spacer 124. This particular embodiment substantially follows the pattern of FIGS. 33 and 34 discussed herein.

Figure 20:
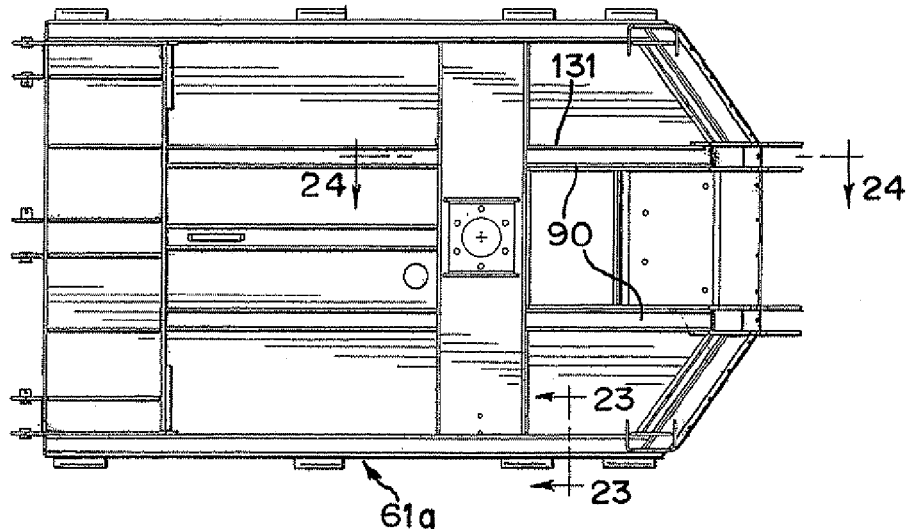
FIG. 20 is a bottom plan view corresponding to FIG. 17, except with underside plating being removed for clarity.
Figure 21:
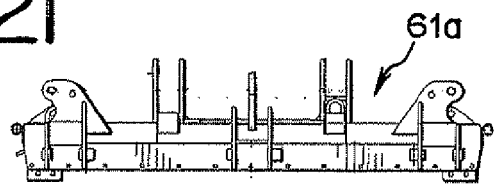
FIG. 21 is a rear end view of the cutter deck of FIG. 20.
Figure 22:
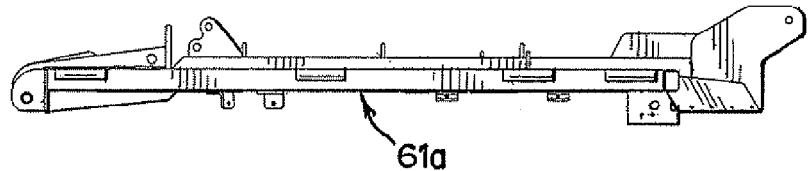
FIG. 22 is a side elevational view of a deck as generally shown in FIG. 20.
Figure 23:
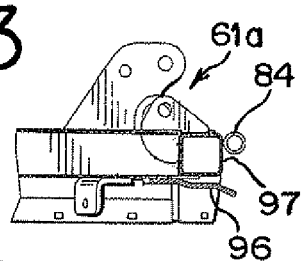
FIG. 23 is a cross-sectional view along the line 23-23 of FIG. 20.
Figure 24:
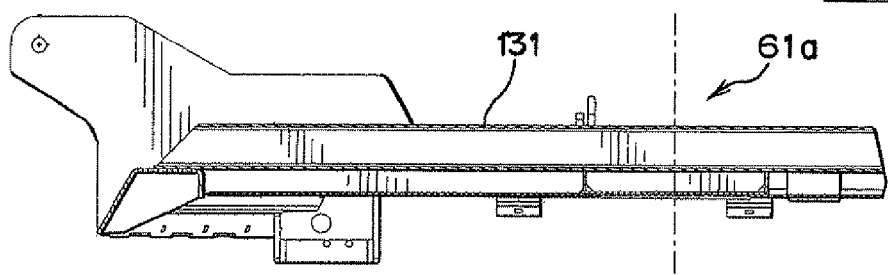
FIG. 24 is a cross-sectional view along the line 24-24 of FIG. 20.

FIG. 20 provides a bottom view of a main or center deck unit 61a and from which the bottom deck is omitted to show other structural features within the deck. An end view is provided in FIG. 21 and a side view is provided in FIG. 22. The FIG. 23 partial cross-section of deck 61a illustrates an outside end including a hinge tube 84 for attachment to a wing deck unit. FIG. 24 shows a partial section along the line 24-24 that is through a strong-back 131 that is longitudinally positioned within this center deck unit.

FIG. 25 provides a view of the deck weldments or units assembled together without operational components such as the gearbox and blade assemblies. This embodiment shows a center deck unit 61b, a left deck unit 62b and a right deck unit 63b. FIG. 26 provides a section along line 26-26. A wing top deck plate 132 extends beyond a wing bottom deck plate 133 by a front end portion 134. An inside front end spacer 135 and the front end portion 134 form a front end box-like beam structure or weldment 136 for this wing unit. A side skirt 137 is shown to be positioned along the outside extent of this wing deck unit 62b.

FIG. 27 provides a cross-section at 27-27 directly along the front edge of this wing deck unit 62b. The front end box-like beam structure 136 also is shown at this location. FIG. 28 provides a cross-section along the front surface of the center deck unit 61b. A front top deck plate 112b, an inside front end spacer 124b and a bottom deck plate 114b are shown. A front end box-like weldment or beam 128*b* is shown formed from the top deck plate and front end spacer.

Concerning the box-like beam or weldment 128*b* formed by the front end inside spacer 124*b* and its association with the top deck plate 112*b* and bottom deck plate 114*b*, inside spacer 124*b* has a plurality of bends or creases that are substantially parallel to each other. In a typical application, these bends or creases likewise are generally parallel to the ground when the cutter is on flat ground. An illustration of the pattern of panels that can be formed by these bends or creases is shown in FIGS. 33 and 34 discussed herein.

FIG. 29 provides a longitudinal cross-section through the center deck unit 61*b*. A top deck plate 138 and a bottom deck plate 139 include an internal deck spacer 115*b* therebetween. Front deck plate spacer 141 and rear deck plate spacer 142 also separate the top deck plate and the bottom deck plate.

A typical inside front end spacer 124*a* is shown in FIG. 30, FIG. 31 and FIG. 32. This includes multiple bends or creases that assist in providing a box beam structure or weldment in combination with a protruding or extending end portion of a top deck plate. It will be appreciated that the bends are oriented to be substantially parallel to each other and to the ground when assembled into a deck unit. Holes 143 are provided in the bottom the spacer in order to facilitate mounting of safety chains as shown in other drawings herein. Another deck plate spacer 144 is shown in FIG. 33 and FIG. 34.

For each of the spacers of FIGS. 30 through 34, multiple bends or creases are provided to achieve the desired assembly. FIG. 32 shows a bend 145, the typical bend angle being on the order of about 90°. Another bend 146 is shown, this one typically being on the order of about 20°. Another bend is shown at 147, typically having a bend angle of about 40°. The deck plate spacer 144 of FIG. 34 also includes a plurality of bends or creases, with an outside bend 148 being approximately 60°.

With further reference to the front end spacer 124*a* of FIGS. 30, 31 and 32, a first panel 181, which extends from the top end edge of the spacer 124*a* and the bend or crease 145, defines the height of separation between the top and bottom deck plates at this location therealong. A second panel 182, which extends between the bends or creases 145 or 146, engages the lower deck to provide a secure attachment of the front end spacer 124*a* and the lower deck. A third panel 183 provides a transition between the second (lower deck engagement) panel 182 and a fourth or overhang panel 184, defined between bend or crease 147 and the bottom end edge of the spacer 124*a*. Overhang panel 184 typically includes the holes 143 from which chains or the like can be suspended and engages the extending upper deck as previously described.

Concerning deck plate spacer 144 of FIGS. 33 and 34, a first panel 191 is shown that extends from the top edge of the spacer 144 and bend or crease 148. Panel 191 defines the height of the separation between the top and bottom deck plates at this location along the deck assembly. A second panel 192, which extends between bends or creases 148 and 149, engages the lower deck to provide a secure attachment of the spacer 144 to the lower deck. A third panel 193 provides a transition between the second (lower deck engagement) panel 192 and a fourth or overhang panel 194, defined between the bend or crease 150 and the bottom edge of the spacer 144. In this illustrated embodiment, the third panel itself includes at least one bend or crease 195 to enhance strength and/or provide the proper angular orientation for the transition effect needed for the particular unit being assembled. Overhang panel 194 typically includes the holes 143 and engages the overhang extension portion of the upper deck to complete formation of the box-like deck assembly. Other bends or creases 149 and 150 are provided as shown.

A wing deck unit, generally designated as 151, is illustrated in FIG. 35 through FIG. 41. Top deck plate 152 has a projecting end portion 153. An inside wall spacer 154 forms a box beam weldment or unit 155 with the projecting end portion of the top deck plate. A curved skirt member 156 is positioned along the outside of this wing deck unit.

FIG. 36 section 36-36 of FIG. 35 shows this construction of the box beam weldment 155 that is formed without inclusion of any top deck plate. FIG. 37 is along Section 37-37 showing the top deck plate 152 and a bottom deck plate 157 along with an outside end spacer 158 positioned at this narrow location of this wing deck unit 151. FIG. 38 shows a partial transverse cross-section along the line 38-38 of FIG. 35. A box beam internal spacer 159 is shown between upper deck 152 and lower deck 157.

A top view of the wing deck unit 151 is illustrated in FIG. 39. FIG. 40 is a cross-sectional view along the line 40-40 of FIG. 39 at the remote end of the projecting end portion 153 of the top deck plate and the remote end of the inside wall spacer 154 combine to provide a front chain support 161. FIG. 41 is a cross-sectional view along the line 41-41 of FIG. 39. The top deck plate 151 has a rear projecting end portion 162 and a rear chain support 163 that is the downward extension of an inside wall spacer 164 at this rear location. A box beam internal structure or weldment 165 is formed to enhance structure and rigidity as discussed herein.

FIG. 42 shows the underside of an embodiment of a wing deck unit 166, with a bottom deck plate arrangement 167 terminating before a front end wall spacer 168. This same wing deck unit 166 is shown in FIG. 43 with the bottom deck plate arrangement being removed, leaving a top deck plate arrangement 169 visible in this view. FIG. 44 is a longitudinal section view through FIG. 42. FIG. 45 is an enlarged sectional view along the line 45-45 of FIG. 43 showing a box structure or weldment 171 fashioned by the remote overarching end portion 172 of the top deck plate arrangement and an inside end wall spacer 173. As in FIG. 43, no bottom deck plate is shown. The inclination angle of the overarching end portion 172 is on the order of 60°.

FIG. 46 is a cross-sectional view along the line 46-46 of FIG. 43. Here, a front end portion of the top deck plate arrangement has an overarching end portion 174 to which an inside front end wall spacer 175 is welded in order to form a box structure or weldment therebetween. FIG. 47 is a sectional view along the line 47-47 of FIG. 42, showing an edge beam 177 adjacent to a tube 178 for assembly onto a center deck unit. A baffle bracket 179 also is shown.

Various embodiments illustrated herein are directed to so-called flex-wing rotary cutters that include three individual cutting sections or decks, hinged together and structured to allow the following of uneven ground more precisely.

Single-deck and two-deck rotary cutters may be practiced. Individual deck weldment structures include upper and lower deck plates. Edges of the upper and lower deck plates are spaced apart along all edges using a third type of structural member in order to maintain separation between the upper and lower deck plates. The separation of the deck plates and the third type of member provides increased structural strength and torsional resistance along the peripheries of the deck structure. In addition, these peripheries provide a convenient location for mounting front and rear enclosures, such as safety chains, to be attached to cover the front and rear openings of the cutter without the need of additional structural members along the peripheries. Other structural members are properly positioned between the deck plates to maintain the desired spacing of the deck plates and to obtain the desired structural strength and torsional resistance within each deck section or unit.

It is important to provide a torsionally stiff deck from side-to-side that provides the capability for a sustained level cut when the machine is in use being pulled through a field or the like. If instead the deck is too limber, the final cut appearance will be uneven or "wavy" due to flexing up and down of the extreme outer corners while traveling over uneven ground. It is also important that the front and rear edges of the rotary cutter deck units have substantial strength, namely strength that is necessary to sustain deck assembly and to support front and rear enclosures such as safety chains, especially when such enclosures are "doubled up" for certain uses, such as highway use, thereby effectively doubling the weight of the safety chains or the like.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein.

The invention claimed is:

1. A rotary cutter comprising:
    a deck unit supported by ground engaging members for transport across an area having foliage to be cut by rotating cutting blades of the rotary cutter;
    a hitch assembly housing a tongue and clevis, said hitch assembly being for connecting the rotary cutter to a powered pulling vehicle;
    an upper deck plate and a lower deck plate of said deck unit, said upper and lower deck plates are positioned, sized and shaped to avoid engagement between said upper deck plate and said lower deck plate;
    said upper deck plate has an end portion that extends outwardly and downwardly to a location beyond the lower deck plate, and said lower deck plate has an end edge;
    a plurality of spacers between said upper and lower deck plates, at least one of said spacers being an end wall spacer having multiple bends generally parallel to each other to define multiple panels thereof;
    said end wall spacer has a first panel between one said bend and an end edge portion secured to said end portion of the upper deck plate at a first location, said end wall spacer having a second panel that engages the lower deck plate;
    said end wall spacer is secured to said end portion of the upper deck plate at a second location outside of said first location, and said end wall spacer and said end portion of the upper deck plate thereby form a box-like structure; and
    said lower deck plate end edge is secured to the second panel of the end wall spacer at a location between said first and second bend areas.

2. The rotary cutter according to claim 1,
    wherein said end wall spacer is a front end wall spacer, and said upper deck plate end portion is a front end portion, further including a rear end wall spacer having multiple bends generally parallel to each other;
    said rear end portion of the upper deck plate extends outwardly and downwardly to a location beyond a rear edge of the lower deck plate; and
    said rear end wall spacer is secured at upper end and lower end bend area thereof to said upper deck plate to thereby form a box-like structure at the rear portion of the deck unit.

3. The rotary cutter according to claim 2, further including a plurality of said deck units, one said deck unit being a main deck unit, and another said deck unit being a wing deck unit; and said main and wing deck units are pivotally engaged together.

4. The rotary cutter according to claim 1, wherein said end wall spacer includes a third panel that is a transition panel between the second panel and a fourth panel that overhangs said lower deck plate and that comprises said second location at which the upper deck place and end wall spacer are engaged to each other.

5. The rotary cutter according to claim 4, wherein said third panel itself includes at least one internal bend generally parallel to the other said bends.

6. The rotary cutters according to claim 4, wherein the bend between the first and second panels is in one direction and the bend between the second and third panels is in a generally opposite direction.

7. The rotary cutter according to claim 6, wherein the bend between the third and fourth panels is in the same general direction as the bend between the second and third panels.

8. A rotary cutter comprising:
    a deck unit supported by ground engaging members for transport across foliage ot be cut by the rotary cutters;
    an upper deck plate and a lower deck plate sized and shaped to define the deck unit, the lower deck plate having an end edge;
    said upper deck plate has an end portion that extends outwardly and downwardly to a location beyond the end edge of the lower deck plate;
    a plurality of spacers between said upper and lower deck plates, at least one of said spacers being an end wall spacer that has multiple bends to define multiple panels thereof;
    said end wall spacer has a first panel between points on the upper deck plate and secured to the upper deck plate at a first location that includes an end edge thereof, and said end wall spacer is secured to the lower deck plate at one of the bends that defines a second panel;
    a third panel that is a transition panel between the second panel and a second location of engagement to the end portion of the upper deck plate; and
    the lower deck plate is secured to the end wall spacer between said first and second locations of engagement of the end wall spacer with the upper deck plate.

9. The rotary cutter according to claim 8, wherein said end wall spacer is a front end wall spacer, and said upper deck plate end portion is a front end portion, further including a rear end wall spacer having multiple bends generally parallel to each other;
    said rear end portion of the upper deck plate extends outwardly and downwardly to a location beyond a rear edge of the lower deck plate; and
    said rear end wall spacer is secured at upper end and lower end bend area thereof to said upper deck plate to thereby form a box-like structure at the rear portion of the deck unit.

10. The rotary cutter according to claim 9, further including a plurality of said deck units, one said deck unit being a main deck unit, and another said deck unit being a wing deck unit; and said main and wing deck units are pivotally engaged together.

11. The rotary cutter according to claim 8, wherein said third panel itself includes at least one internal bend generally parallel to the other said bends.

12. The rotary cutter according to claim 8, wherein the bend between the first and second panels is in one direction and the bend between the second and third panels is in a generally opposite direction.

13. The rotary cutter according to claim 8, further including a fourth panel, and wherein the bend between the third and fourth panels is in the same general direction as the bend between the second and third panels.

14. A rotary cutter comprising:
- a deck unit supported by ground engaging members for transport across foliage ot be cut by the rotary cutters;
- an upper deck plate and a lower deck plate sized and shaped to define the deck unit, the lower deck plate having an end edge;
- said upper deck plate has an end portion that extends outwardly and downwardly to a location beyond the end edge of the lower deck plate;
- a plurality of spacers between said upper and lower deck plates, at least one of said spacers being an end wall spacer that has multiple bends to define multiple panels thereof;
- said end wall spacer has a first panel between points on the upper deck plate and secured to the upper deck plate at a first location that includes an end edge thereof, and said end wall spacer is secured to the lower deck plate at one of the bends that define a second panel;
- a third panel that is a transition panel between the second panel and a second location of engagement to the end portion of the upper deck plate;
- the lower deck plate is secured to the end wall spacer between said first and second locations of engagement of the end wall spacer with the upper deck plate; and
- the bend between the first and second panels is in one direction and the bend between the second and third panels and between the third panel and a fourth panel therebelow is in a direction generally opposite to the bend between the first and second panels.

15. The rotary cutter according to claim 14, wherein said end wall spacer is a front end wall spacer, and said upper deck plate end portion is a front end portion, further including a rear end wall spacer having multiple bends generally parallel to each other;
- said rear end portion of the upper deck plate extends outwardly and downwardly to a location beyond a rear edge of the lower deck plate; and
- said rear end wall spacer is secured at upper end and lower end bend area thereof to said upper deck plate to thereby form a box-like structure at the rear portion of the deck unit.

16. The rotary cutter according to claim 15, further including a plurality of said deck units, one said deck unit being a main deck unit, and another said deck unit being a wing deck unit; and said main and wing deck units are pivotally engaged together.

* * * * *